US005468842A

United States Patent [19]

Howard, Jr.

[11] Patent Number: 5,468,842
[45] Date of Patent: Nov. 21, 1995

[54] ANNEALED LINEAR HIGH DENSITY POLYETHYLENE AND PREPARATION THEREOF

[75] Inventor: Edward G. Howard, Jr., Hockessin, Del.

[73] Assignee: E. I. Du Pont de Nemours and Company, Wilmington, Del.

[21] Appl. No.: 317,493

[22] Filed: Oct. 4, 1994

Related U.S. Application Data

[62] Division of Ser. No. 95,363, Jul. 20, 1993, Pat. No. 5,382,643, which is a continuation of Ser. No. 903,408, Jun. 23, 1992, abandoned.

[51] Int. Cl.$^6$ .................................................. C08F 6/00
[52] U.S. Cl. ...................... 528/481; 528/503; 526/352
[58] Field of Search .................................. 528/481, 503; 526/352

[56] References Cited

U.S. PATENT DOCUMENTS 5,037,928  8/1991  Li et al. .................................. 526/352

FOREIGN PATENT DOCUMENTS 0278569  8/1988  European Pat. Off. ........ B29C 47/86
373800   6/1990  European Pat. Off. .
61-107378 5/1986  Japan .................................. G09F 3/03

OTHER PUBLICATIONS

*Encyclopedia of Poly. Sci. and Eng.*, "Emulsion Polymerization to Fibers Manufacture", Wiley & Sons, 6, 441–445 (1986).

Lupton, J. M. et al, "Physical Properties of Extended–Chain High–Density Polyethylene", *J. Applied Polymer Science*, 18, 2407–2425 (1974).

Geil, P. H. et al, "Morphology of Polyethylene Crystallized from the Melt Under Pressure", *J. Polymer Science: Part A*, 2, 3707–3720 (1964).

Schotland, R. S. et al, "A High Temperature Annealing Process to Improve the Stress Crack Resistance of High Density Polyethylene", *Polym. Prep.*, Amer. Chem. Soc., Div. Polym. Chem., 9(2), 1219–1226 (1968).

Primary Examiner—Joseph L. Schofer
Assistant Examiner—David Wu

[57]  ABSTRACT

What is provided is an annealed, linear, high density polyethylene (LHDPE) and a process for the preparation of tough impact resistant articles made of such materials.

2 Claims, No Drawings

ANNEALED LINEAR HIGH DENSITY POLYETHYLENE AND PREPARATION THEREOF

This is a division of application Ser. No. 08/095,363, filed Jul. 20,1993, now U.S Pat. No. 5,382,643 which is a continuation of application Ser. No. 07/903,408 filed Jun. 23, 1992, now abandoned.

FIELD OF THE INVENTION

This invention relates to an annealed linear, high density polyethylene (LHDPE), and particularly to the preparation of tough, impact resistant articles therefrom.

BACKGROUND OF THE INVENTION

Linear, high density polyethylene (LHDPE) in a "medium" molecular weight range of about 30,000 to about 300,000 (melt index range of about 300 to about 0.01), prepared by low-pressure polymerization of ethylene in the presence of coordination-type catalysts, is a well known, widely used commercial polymer. LHDPE is characterized by having virtually no long-chain branching, short-chain (methyl) branching of less than about 5 $CH_3$ groups per 1000 carbon atoms, and a density of at least 0.94 $g/cm^3$. Highly linear LHDPE has a density of at least about 0.96 $g/cm^3$. It is also well known that LHDPE is crystalline and, after conventional melt-processing, exhibits folded chain crystalline morphology and a melting point in the range of about 128°–137° C. The literature reports many attempts to change the morphology of LHDPE to a more extended chain form by recrystallization at high pressures, resulting in generally higher melting, more crystalline and brittle products. The preparation and properties of these so-called extended chain products have been extensively reviewed; see, for example, Lupton et al. J. Appl. Poly. Sci., 18, 2407 (1974); Geil et al. J. Poly. Sci: A, 2, 3707 (1964).

European Patent Application 89312565.8 (E. I. du Pont de Nemours and Company, published 20 Jun. 1990) discloses heat treatment of ultrahigh molecular weight linear polyethylene (UHMWPE) at 320°–340° C. and atmospheric pressure for at least 30 min, usually about 4 hours, resulting in improved impact resistance, tensile properties and elongation. UHMWPE, as defined in the reference, has a molecular weight of at least 400,000.

European Patent Application 88200202 (Stamicarbon, published 17 Aug. 1988) discloses production of cast film of high density polyethylene of melt index 1-100 wherein the molten polymer is processed at a temperature below 220° C., preferably below 200°, more preferably below 180° C.

There are many reports of the annealing of medium molecular weight LHDPE at or below the crystalline melting point to improve crystalline perfection and polymer properties. For example, Schotland et al., Polym. Prepr., Amer. Chem. Soc., Div. Polym Chem., 9 (2), 1219 (1968), describe the effects on certain properties and morphology of annealing blow-molded bottles of high density, medium molecular weight polyethylene at temperatures up to 127° C. Applicant is unaware, however, of any disclosure of LHDPE "annealed" by heating at temperatures close to the decomposition point of the polymer, i.e., in the temperature range of about 250° to about 335° C., or of LHDPE prepared by any process having the improved properties realized in the present invention.

SUMMARY OF THE INVENTION

This invention provides an annealed folded chain linear polyethylene having a density of at least 0.94 $g/cm^3$ and a melt index in the range of about 0.01 to 10, further characterized by having (1) a notched Izod impact resistance at least 50% higher, and (2) a tensile stress at yield at least 10% higher than that of non-annealed polyethylene of similar density and melt index.

The invention product is prepared in a process consisting essentially of the following steps:

(a) forming an article of non-annealed folded chain linear polyethylene having a density of at least 0.94 $g/cm^3$ and melt index in the range of about 0.01 to 10;

(b) annealing the article of step (a) by subjecting said article in an inert atmosphere to a temperature of about 250° to about 335° C., without agitation, for at least about 30 min; and (c) cooling the article non-precipitously to a temperature of about 120° C. or below.

Preferably the time in step (b) is about 1 to 4 hours, and the temperature is about 275° to about 325° C.

Preferably the melt index of the polyethylene employed in step (a) is about 0.05 to 5, more preferably 0.1 to 2.

Preferred products of the invention have notched Izod impact resistance of at least 100% higher than that of the non-annealed linear polyethylene of similar density and melt index used in step (a) of their preparation. Many of the preferred products of the invention exhibit elongation at break of at least 200% higher than that of the starting polyethylene.

DETAILS OF THE INVENTION

The products of the present invention process have dramatically improved impact resistance and higher tensile stress at yield. Many also show much higher elongation at break. The heating step wherein linear high density polyethylene articles are heated in an inert atmosphere at a temperature of about 250° to about 335° C., is herein defined as "annealing". During the annealing process, the article should be confined during the heating step with no mixing, stirring, or agitation of any kind. If the polymer is agitated during the heating step, the improvements are lost and the product exhibits the properties of non-annealed polymer. For this reason, remolding or other melt processing of the polymer articles after heat treatment should be avoided. However, the invention product can be remelted without loss of improved properties, provided that agitation of the molten polymer is avoided.

Although the invention process is reversible (that is, the improvements resulting from high temperature annealing can be lost through melt agitation), said improvements can also be fully restored by reannealing under the prescribed process conditions and avoiding subsequent agitation of the molten polymer.

For purposes of this invention, "linear high density polyethylene" (LHDPE) is defined as a linear polyethylene of folded chain crystalline morphology which is essentially free of long chain branches and has fewer than 5 methyl groups per 1000 carbon atoms, a density of at least 0.94 $g/cm^3$ and a melt index (ASTM D-1238) in the range of about 0.01 to about 10. The density and linearity limitations on the starting polyethylene are especially important; more heavily branched polyethylenes (those having densities below about 0.94 $g/cm^3$) are unsuitable.

The annealing temperatures required in the process of the invention approach the thermal decomposition temperature of the polymer. Increasing melt index indicates the onset of thermal decomposition. Accordingly, it will be understood that at the higher temperatures within the operable range, shorter heating times may be desirable to avoid or minimize decomposition.

Use of an inert atmosphere is also essential in the invention process as the presence of oxygen will dramatically accelerate polymer decomposition at the required annealing temperatures. "Inert atmosphere" means a gaseous or vaporous environment that is stable and inert to process conditions. Suitable inert gases include nitrogen and the noble gases. Suitable inert vapors include those of nonflammable, chemically inert and thermally stable liquids such as the perfluoroalkylpolyethers. Vacuum may also be employed, but is not preferred.

The invention products retain folded chain morphology since elevated pressures required to induce extended chain morphology are not employed. The present products are not equivalent to those prepared by high pressure crystallization procedures.

The products of this invention are especially useful in load-bearing applications such as seals, bushings, bearings, prosthetic devices and the like where non-annealed LHDPE as well as other polymers are currently used. Articles processed according to this invention have strength properties approaching those of ultrahigh molecular weight polyethylene (UHMWPE), yet the starting polyethylene is of low molecular weight (relative to UHMWPE) and can easily be formed or fabricated by, for example, injection molding; UHMWPE is not injection moldable because of its essentially infinite melt viscosity which results in void formation and loss of properties during fabrication.

This invention may alternatively be described as providing an annealed folded chain linear polyethylene, and shaped articles thereof, having a density of at least 0.94 g/cm$^3$ and a melt index in the range of about 0.01 to 10, further characterized by having a notched Izod impact resistance of at least 10 ft lb per in of notch and a tensile stress at yield of at least 4 kpsi (27.6 MPa).

The invention will be more readily understood by reference to the following non-limiting examples which illustrate its basic principles and unique advantages. In the examples, properties are measured by means of standard ASTM tests carried out under constant humidity (50% relative humidity) and temperature (23° C.) conditions. Melt index was measured according to ASTM D-1238. Tensile properties were measured according to ASTM D-638. Impact resistance was measured using the notched Izod test according to ASTM D-256. Densities of the post-annealing material are expected to show some increase over that of the material before annealing. Temperatures are in degrees Celsius.

EXAMPLE 1

Commercial linear high density polyethylene, Quantum (formerly USI) Petrothene® LY520, having a melt index of 0.14 and a density of 0. 949 g/cm$^3$, was freed from residual solvent by drying at 275° C. under nitrogen for 2 h. The dried polymer was chopped in a large Wiley mill and hot pressed at 160° C and 1 kpsi pressure into several 6.5 in×3 in×0.125 in plaques. The plaques, individually contained in a mold, were heated under nitrogen for 2 h at different temperatures in the range of 275° to 335° C., cooled slowly under nitrogen to below about 120° C. and then to room temperature. The polymer heated at 325° C. had a DSC melting point of 144.9° C. and a heat of fusion of 200 J/g. Other properties of the products are shown in Table 1 and compared with an unheated plaque of the same polymer.

TABLE 1

| Properties | Heat Treatment (2 h) | | | | |
| --- | --- | --- | --- | --- | --- |
| | None | 275° | 300° | 325° | 335° |
| Tensile Properties | | | | | |
| Tensile Str., psi | | | | | |
| Yield | 3822 | 4250 | 4213 | 4369 | 4213 |
| Max | 3824 | 4250 | 4214 | 4377 | 4214 |
| Break | 2689 | 3391 | 3461 | 3328 | 3461 |
| Elongation, % Break | 650 | 712 | 953 | 827 | 936 |
| Tens. Modulus, kpsi | 286 | 289 | 279 | 286 | 328 |
| Izod Impact, ft lb/in of notch | 6.5 | 16.4 | 15.7 | 15.0 | 10.0 |

EXAMPLE 2

The procedure of Example 1 was repeated but with a lower molecular weight linear high density polyethylene, Chevron AD 9650, having a melt index of 0.8 and a density of 0. 960 g/cm$^3$. Hot pressed plaques were tested (i) without heat treatment; (ii) after heat treatment at 290° to 300° C. for 2 hours; and (iii) after heat treatment, cooling, remelting and mixing at 160° C. The last series shows the reversibility of the process resulting from remelting with agitation. The heat treated polymer from (ii) had a DSC melting point of 134.7° C. and a heat of fusion of 225.5 J/g. Other properties are given in Table 2.

TABLE 2

| Properties | Starting Polymer | Heated 290–300° C. | Melted, Mixed at 160° C. |
| --- | --- | --- | --- |
| Tensile Properties | | | |
| Tensile Str., psi | | | |
| Yield | 3885 | 4271 | 3881 |
| Max | 3885 | 4276 | 3883 |
| Break | 2486 | 3507 | 2599 |
| Elongation, % Break | 700 | 950 | 687 |
| Tens. Modulus, kpsi | 288 | 262 | 189 |
| Izod Impact, ft lb/in of notch | 3.8 | 10 | 3.2 |

EXAMPLE 3

The procedure of Example 1 was repeated but with a higher molecular weight linear high density polyethylene, Quantum Petrothene® LY 600, having a melt index of 0.05 and a density of 0.951 g/cm$^3$. Hot pressed plaques were tested without heat treatment and after heat treatment at 298° C. for 3 hours. Results are given in Table 3.

TABLE 3

| Properties | Hot Pressed | Hot Pressed and Heated at 298° |
| --- | --- | --- |
| Tensile Properties | | |
| Tensile Str., psi | | |
| Yield | 3764 | 4334 |
| Max | 3697 | 4337 |
| Break | 3236 | 2926 |
| Elongation, % Break | 682 | 635 |

TABLE 3-continued

| Properties | Hot Pressed | Hot Pressed and Heated at 298° |
|---|---|---|
| Tens. Modulus, kpsi | 220 | 282 |
| Izod Impact, ft lb/in of notch | 7.3 | 13.9 |

COMPARATIVE EXAMPLE

The procedure of Example 1 was repeated but with a lower density, more highly branched, polyethylene, Quantum Petrothene® NPE 983, having a melt index of 0.25 and a density of 0.921 g/cm³. Hot pressed plaques were tested without heat treatment and after heat treatment at 298° C. for 3 hours. The heat-treated polymer had a melting point (DSC) of 139° C. and a heat of fusion of 120 J/g. Other results, given in Table 4, show that high temperature annealing is ineffective with a more highly branched polyethylene in improving impact resistance and elongation, although tensile strength at yield is improved.

TABLE 3

| Properties | Hot Pressed | Hot Pressed and Heated at 298° |
|---|---|---|
| Tensile Properties | | |
| Tensile Str., psi | | |
| Yield | 1424 | 1716 |

TABLE 3-continued

| Properties | Hot Pressed | Hot Pressed and Heated at 298° |
|---|---|---|
| Max | 2266 | 1749 |
| Break | 2266 | 1732 |
| Elongation, % Break | 600 | 462 |
| Tens. Modulus, kpsi | 50 | 67 |
| Izod Impact, ft lb/in of notch | 12.7 | 9.7 |

I claim:

1. A process for preparing polyethylene consisting essentially of the following steps:

(a) forming an article of non-annealed folded chain linear polyethylene having a density of at least 0.94 g/cm³ and melt index in the range of about 0.02 to 10;

(b) annealing the article of step (a) by subjecting said article in an inert atmosphere to a temperature of about 250° to about 335° C., for at least about 30 min without agitation; and (c) cooling the article non-precipitously to a temperature of about 120° C. or below.

2. The process of claim 1 wherein the time in step (b) is about 1 to 4 hours, and the temperature is about 275° to about 325° C.

* * * * *